United States Patent [19]
Kupferschmidt

[11] Patent Number: 4,800,587
[45] Date of Patent: Jan. 24, 1989

[54] TELEPHONE LINE PROTECTOR WITH LINE DISCONNECT AND AN ENTRANCE TERMINAL ASSEMBLY INCORPORATING A PLURALITY OF PROTECTORS

[75] Inventor: Albert Kupferschmidt, Highland Park, Ill.

[73] Assignee: Northern Telecom Limited, Montreal, Canada

[21] Appl. No.: 47,464

[22] Filed: May 11, 1987

[51] Int. Cl.[4] .............................................. H02H 3/22
[52] U.S. Cl. ..................................... 379/437; 379/451; 361/119
[58] Field of Search ............... 379/412, 437, 451, 399; 361/119, 118, 117, 127, 111; 337/32, 34

[56] References Cited

U.S. PATENT DOCUMENTS

| | | | |
|---|---|---|---|
| 3,993,933 | 11/1976 | Menninga | 337/32 X |
| 4,159,500 | 6/1979 | Baumbach et al. | 379/412 X |
| 4,208,694 | 1/1980 | Gilberts | 361/119 |
| 4,447,848 | 5/1984 | Smith | 337/34 X |
| 4,493,003 | 1/1985 | Mickelson et al. | 361/119 |
| 4,533,971 | 8/1985 | Smith | 361/119 |
| 4,584,624 | 4/1986 | Hines | 361/119 |
| 4,641,218 | 2/1987 | Scalera | 361/119 |

Primary Examiner—Eugene R. La Roche
Assistant Examiner—Seung Ham
Attorney, Agent, or Firm—Foley & Lardner, Schwartz, Jeffery, Schwaab, Mack, Blumenthal & Evans

[57] ABSTRACT

A housing for a telephone line protector comprises a well in which are positioned two spring biased members. A first spring biased member is adjacent to the back end of the well and biased away therefrom. The second spring biased member is axially aligned with and biased away from the first spring biased member. One line conductor is connected to the first spring biased member and the other line conductor is connected to a terminal at the back end. The spring bias of the second spring biased member is stronger than the bias of the first spring biased member. Insertion of a protector module first causes movement of the first spring biased member to contact the terminal at the back end, and then moves the second spring biased member relative to the first spring biased member. The protector module contacts a ground connection at the front end of the well as it is inserted.

6 Claims, 5 Drawing Sheets

TELEPHONE LINE PROTECTOR WITH LINE DISCONNECT AND AN ENTRANCE TERMINAL ASSEMBLY INCORPORATING A PLURALITY OF PROTECTORS

BACKGROUND OF THE INVENTION

1. Field of the Invention

This invention relates to telephone line protectors with line disconnect on removal of a protector from the protector housing. The invention also relates to an entrance terminal assembly incorporating a plurality of such protectors.

2. Related Art

At a subscriber's premises, it is normal to provide a protector at a position where the incoming cable conductors connect to the wiring at the subscriber's premises. When it is desired to inspect, and test, the cable conductors to the premises, it is desirable to provide some means of isolating the cable conductors from the wiring at the premises.

It has been proposed to provide a connection in the protector housing which connects the incoming cable conductor to the subscriber wiring, the connection being broken when the protector is removed. This is provided, in one example, by a spring loaded member which is pushed down by the protector as the protector is screwed into the housing. The spring loaded member connects two terminals in the housing when fully depressed, connecting the cable conductor to the premises wiring.

A problem arises with such an arrangement in that close manufacturing and assembly tolerances are necessary to ensure effective operation. It is possible that no contact occurs with the terminals at one extreme and at the other extreme full contact between the spring loaded member and the terminals can occur before the protector is fully inserted. Any attempt to fully insert the protector can result in damage which will interfere with the operation of the connection between cable and premises wiring and/or the protector.

SUMMARY OF THE INVENTION

The present invention provides a telephone line protector comprising a housing having two spring biased members in series, one spring bias being stronger than the other. Insertion of a protector pushes the two members toward a cable terminal with the member remote from the protector being moved into contact with the cable terminal on compression of a first spring. A connection is made through the member and the first spring to a terminal connected to the premises wiring. Continued insertion of the protector compresses a second spring. The second spring is stronger than the first spring. Considerable variation in tolerances can be accommodated. The invention also includes an entrance terminal assembly having a plurality of line protector housings.

BRIEF DESCRIPTION OF THE DRAWINGS

The invention will be readily understood by the following description of certain embodiments, by way of example, in conjunction with the accompanying drawings, in which.

DETAILED DESCRIPTION OF THE EMBODIMENTS

Figure 1:
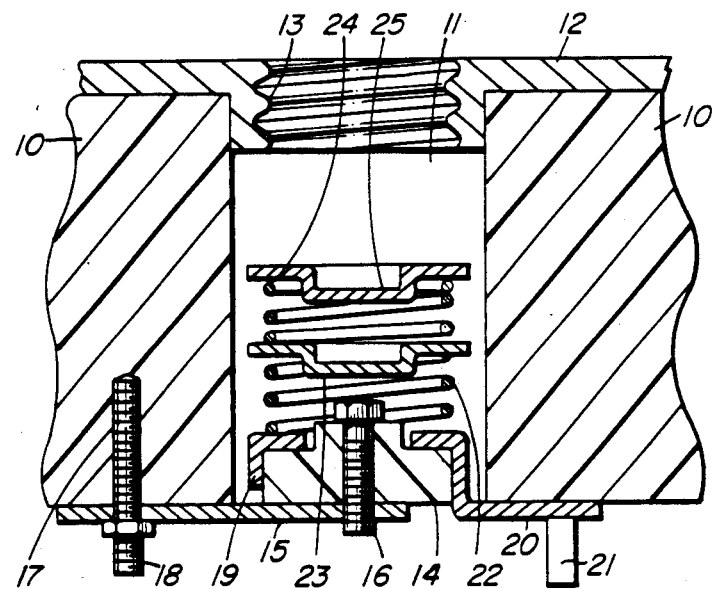
FIG. 1 is a cross-section through a protector well, illustrating the embodiment with the protector removed.

Considering FIG. 1, a dielectric member 10 has a well 11 for holding a protector, or as also referred to, a surge arrestor. At one end of the well 11 is a ground plate 12 having a threaded bore 13. At the other end of the well there is a dielectric spacer 14 which is attached to a metal bar 15 by means of a metal pin 16. The bar 15 is attached to the dielectric member 10 by a stud 17 which has a portion 18 to which a cable conductor can be attached. A metal cup or disc 19 is positioned over the inner surface of the spacer 14, the cup 19 having an extension 20 carrying a terminal 21 to which a line conductor can be attached.

Resting on the cup 19 is a compression spring 22 and in turn a disc member 23 rests on the spring 22. A further spring 24 rests on the disc 23 and a further disc member 25 rests on spring 24. It will be appreciated that in FIG. 1 there is no electrical connection between the terminal 21 and pin portion 18. Thus any conductor attached to portion 18 is isolated from any conductor attached to terminal 21. Generally, two such arrangements as in FIG. 1 are provided for each telephone line pair, one for Tip and one for Ring.

Figure 2:
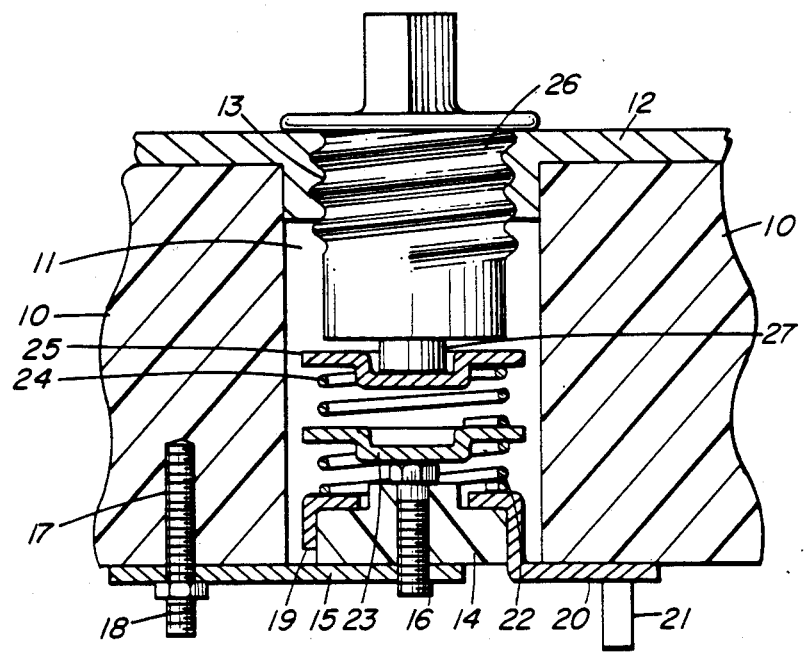
FIG. 2 is a similar cross-section to that of FIG. 1, but illustrating the arrangement when the protector is in position.

FIG. 2 illustrates the arrangement of FIG. 1 as it is altered by insertion of a protector, indicated at 26. The sequence from FIG. 1 to FIG. 2 is as follows. As the protector 26 is screwed in, an electrode 27 extending from the protector makes initial contact with disc member 25. Continued insertion of the protector pushes down disc 25 and spring 24. Spring 24 is arranged to be stronger, i.e. stiffer or less compliant, than spring 22. Therefore, spring 24 pushes down disc 23 which in turn compresses spring 22. Eventually the disc 23 makes contact with the inner end of pin 16. It is possible to continue inserting the protector 26 as spring 24 will now compress. There is an electrical connection between terminal 21 and pin portion 18 via extension 20, cup 19, spring 22, disc 23, pin 16 and bar 15. The disc 23 is firmly pushed into contact with pin 16. The protector 26, of any conventional form, provides the usual overvoltage surge protection breakdown via the the metal casing of the protector and the ground plate 12.

Thus, by removing the protector, or even partially unscrewing the protector, isolation can be obtained.

Figure 3:
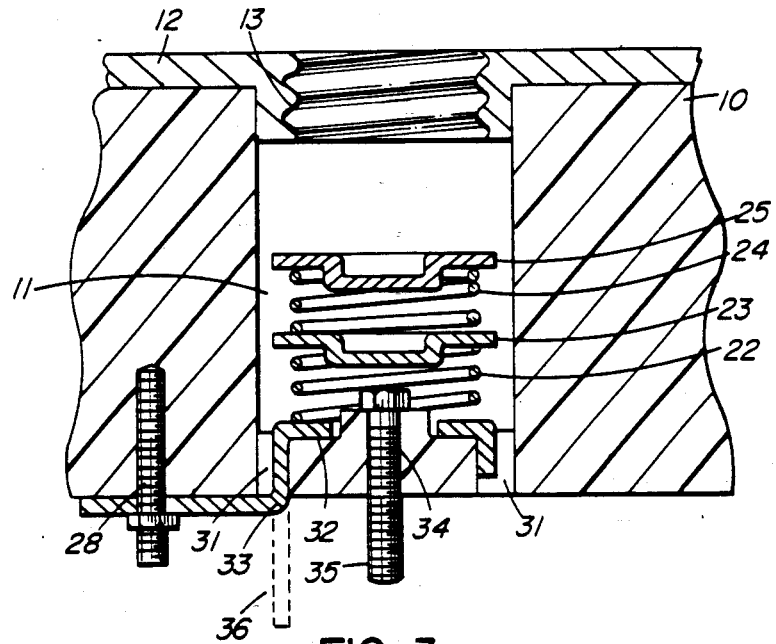
FIG. 3 is a cross-section through a protector well, illustrating an alternative embodiment, with the protector remove.
Figure 4:
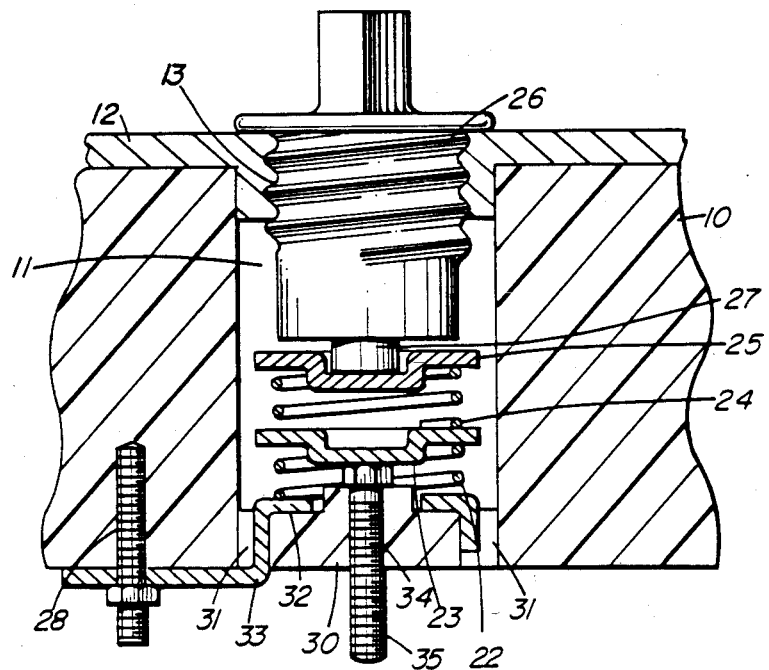
FIG. 4 is a cross-section similar to that of FIG. 3, illustrating the arrangement with the protector in position.

An alternative embodiment is illustrated in FIGS. 3 and 4. In this embodiment the same reference numerals have been used for those items common with the embodiment of FIGS. 1 and 2.

The primary difference in FIGS. 3 and 4 is that instead of a dielectric spacer at the lower end of the well, there is an end wall 30 with apertures 31 therethrough. A cup 32 rests on the end wall 30 and an extension 33 extends through one of the apertures 31 and along the bottom surface of the dielectric member 10. The extension 33 is attached by stud 28, to which can be attached the line conductor. A pin 34 extends through the end wall 30 and has a portion 35 for attachment of the cable conductor. The cup 32 can be assembled by having the extension 33 extending parallel to the axis of the cup, as indicated in dotted outline at 36. The extension is formed up against the member 10 after assembly.

FIG. 4 illustrates the arrangement of FIG. 3 as it is altered by insertion of a protector 26. The sequence is the same as for FIGS. 1 and 2. As the protector 26 is screwed in, electrode or similar member 27 makes initial contact with disc 25. Continued insertion of the protector pushes down disc 25 and spring 24. Spring 24 being stronger than spring 22, pushes down disc 23 and compresses spring 22. Disc 23 eventually contacts pin 34. Any continued insertion of the protector 26 compresses spring 24.

Connection between pin 34 and stud 28 is via disc 23, spring 22, cup 32 and extension 33. Removal, or even partial unscrewing, of the protector isolates pin 34 from stud 28.

Figure 5:
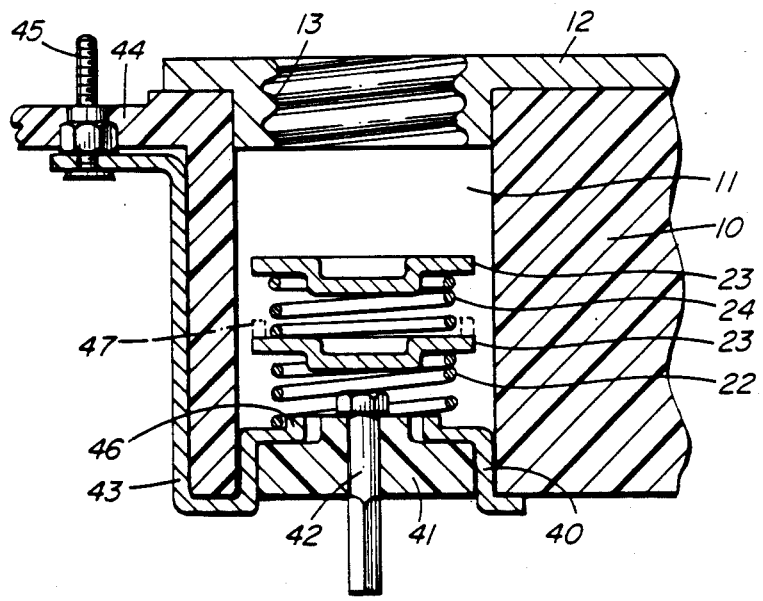
FIG. 5 is a cross-section through a protector well, illustrating a further alternative embodiment with the protector removed.
Figure 6:
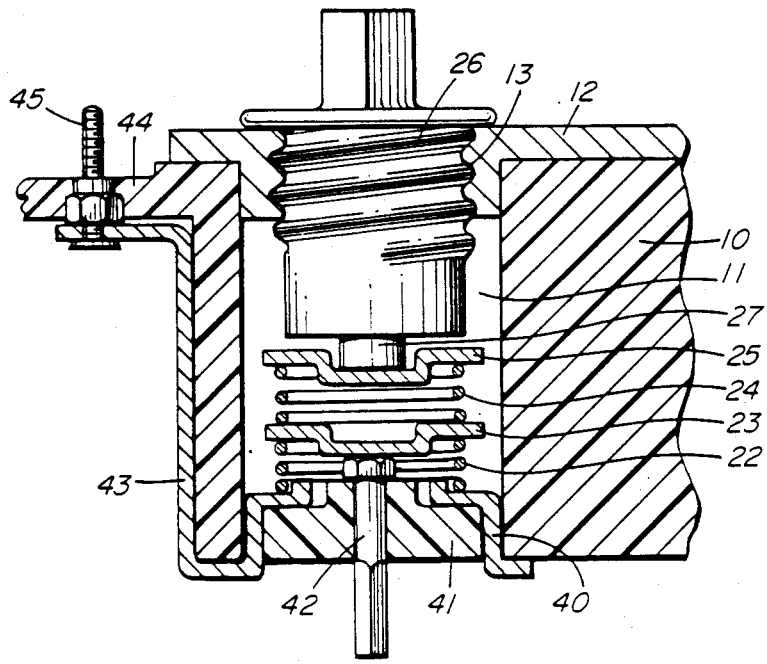
FIG. 6 is a cross-section similar to that of FIG. 5, illustrating the arrangement with the protector in position.

FIGS. 5 and 6 illustrate an arrangement in which the line conductor stud 17 of FIGS. 1 and 2 and stud 28 of FIGS. 3 and 4 are moved to a top surface. Generally the same reference numerals are used in FIGS. 5 and 6 as in FIGS. 1 to 4, for the same items. The arrangement, or embodiment, of FIGS. 5 and 6 is particularly suitable for use in a multiple unit entrance member for protecting a multiplicity of telephone line pairs.

In FIG. 5 there is the dielectric member 10 with well 11 and a ground plate 12. In the base of the well is a conducting cup member 40 having a dielectric plug 41 holding a pin 42. From one side of the cup member 40 extends a connector member 43, the member 43 extending, in the example, up the outside of the dielectric member 10 to an outer web 44. Here the connector member connects to a line terminal 45. Positioned on the cup member 40 is the first spring 22, first disc 23 rests on spring 22, the further spring 24 rests on disc 23 and the further disc 25 rests on spring 24. The discs 23 and 25 can be formed to provide location relative to the upper ends of the springs. The lower end of spring 22 can be located by an annular head 46 on the cup member 40. A similar head can be provided on the top surface of disc 23, as indicated in dotted outline at 47.

FIG. 6 illustrates the protector 26 screwed into the well in the threaded bore 13. The lower electrode or other member 27 pushes down on disc 25. Weaker spring 22 is compressed first, moving the first disc 23 into contact with the pin 42. Continued insertion of the proctector collapses spring 24. The arrangement of FIGS. 5 and 6 can be provided in a multiple unit in which a telephone cable stub has its conductors connected to the pins 42. The unit can be supplied with the cable stub connected and the connections sealed as by potting, that is, sealing or covering the bottom parts by potting material.

Figure 7:
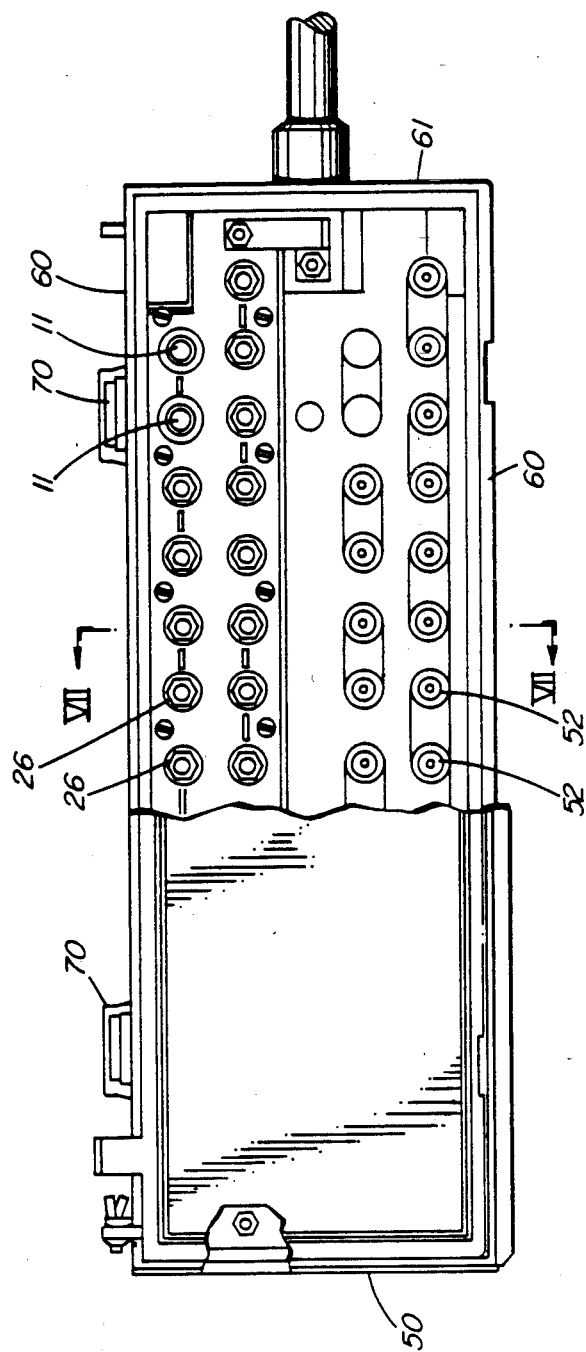
FIG. 7 is a plan view of a multiple protector unit entrance terminal, with part of the cover removed, which embodies protector well arrangements similar to those in FIGS. 5 and 6.
Figure 8:
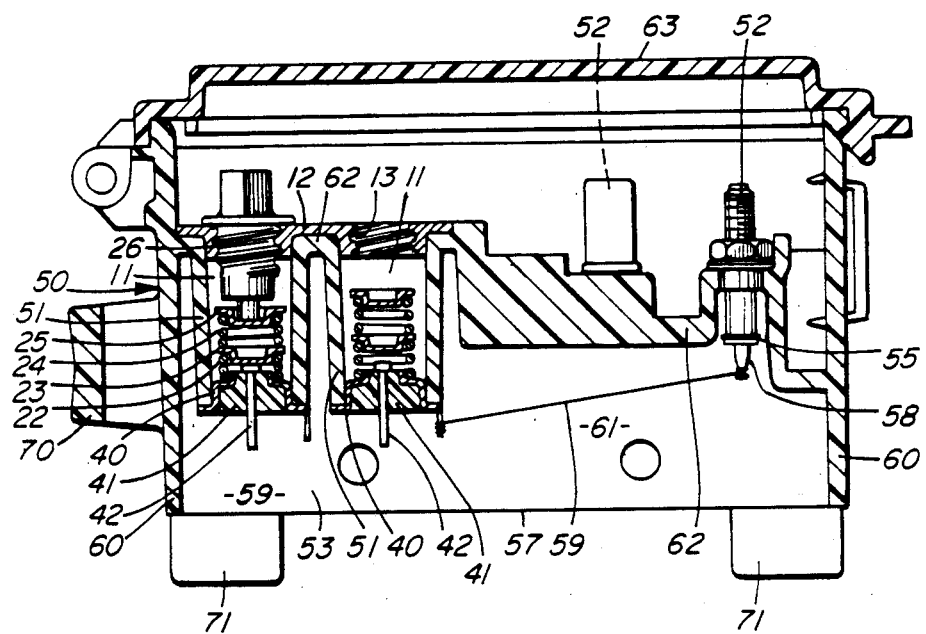
FIG. 8 is a cross-section on the line VII—VII of FIG. 7.

FIGS. 7 and 8 illustrate a multiple telephone pair building entrance unit. In FIG. 7, the hingedly attached cover is partly omitted for clarity, as are also some minor details of the main body member.

As illustrated in FIGS. 7 and 8, an entrance terminal assembly comprises an elongate main body member 50 having a plurality of tubular formations 51 which form a plurality of wells 11. The tubular formations 51 are arranged in pairs, in the example, conveniently arranged to protect telephone conductor pairs and protector modules are shown in position in some of the tubular formations 51. In the example, as illustrated, the same reference numerals are used for those items common to FIGS. 5 and 6. The tubular formations 51, with the protector assemblies, lie on one side of a lateral center line, while terminals 52, to which are connected the line conductors, are on the other side. Terminals 52 correspond to terminals 45 in FIGS. 5 and 6 and studs 17 and 28 in FIGS. 1 and 2 and in FIGS. 3 and 4 respectively. A further difference is that tangs 57 depend from the cup members 40. In the arrangement illustrated in FIGS. 7 and 8, cable conductors are connected to pins 42, while tangs 57 are connected to the rear ends 58 of the terminals 52 by a conductor 59. After connection of conductors to the pins 42, and the connection of conductors 59, the space or volume 53 can be filled with a potting compound.

The main body member, in the example illustrated, has side walls 60 and ends walls 61. The tubular formations 51 depend from a central wall 62 extending between the side walls. The terminals 52 also depend from the central wall, the central wall being at a different level for formations 51 than the terminals 52. A cover 63 is hingedly mounted at the top edge of one side wall and extends across to the other side wall. The cover overlaps the top edges of the end and side walls. Brackets 70 can be provided on the side wall 60 on which is provided the hinge mounting of the cover. These brackets can provide for suspending a unit on a cable or similar member. Brackets 71 can be provided on the end walls 61 to provide for other mounting arrangements.

What is claimed is:
1. A telephone line protector housing comprising:
   a housing defining a well having front and back ends;
   a ground connection at said front end, said ground connection at said front end including a threaded bore for reception of a threaded protector module into said well;
   a cable conductor attachment and a line conductor attachment each connected to the housing;
   a first member in said well, said first member being adjacent to and spring biased away from said back end;
   a second member in said well, said second member being adjacent to and spring biased away from said first member, the spring bias on the second member being stronger than the spring bias on the first member;
   means for connecting a line conductor to said first and second members via said line conductor attachment; and
   means for connecting a cable conductor to said first member via said cable conductor attachment,
   whereby, upon initial insertion of said protector module, said module contacts and moves said second member which sequentially moves said first member into contact with said means for connecting said cable conductor, and further insertion further moves said second member only.

2. A protector housing as claimed in claim 1, wherein said first spring biased member comprises a first metal disc-like member and a compression spring extending between the disc-like member and an insulating abutment member at said back end.

3. A protector housing as claimed in claim 2, said abutment member including a metal annular member, a terminal attached to said metal annular member.

4. A protector housing as claimed in claim 3, wherein said second spring biased member comprises a second metal disc-like member and a compression spring extending between said disc-like member and said metal annular member.

5. A protector housing as claimed in claim 3, wherein said terminal includes an electrically conducting member extending through said abutment member and having a front end positioned for contact with said first metal disc-like member.

6. A method of protecting a telephone line via a protector housing, comprising the steps of:
forming a well in said housing, said well having front and back ends;
attaching a ground connection to said front end, said ground connection having a threaded bore for receiving a threaded protector module;
connecting a line conductor attachment to said housing;
connecting a cable conductor attachment to said housing;
inserting a first spring in said well;
inserting a first member in said well on said first spring;
inserting a second spring stronger than said first spring in said well on said first member;
inserting a second member in said well on said second spring;
interconnecting the line conductor attachment and the first and second members;
interconnecting the cable conductor attachment with a pin mounted adjacent to the first member;
inserting said protector module in said threaded bore against said second member, first compressing said first spring whereby said first disc contacts said pin, and whereby further inserting of said protector module compresses said second spring and moves said second member.

* * * * *